United States Patent [19]

Tokar

[11] 4,157,902

[45] Jun. 12, 1979

[54] AIR CLEANER SYSTEM FOR OVER-HIGHWAY TRUCKS

[75] Inventor: Joseph C. Tokar, Apple Valley, Minn.

[73] Assignee: Donaldson Company, Inc., Minneapolis, Minn.

[21] Appl. No.: 858,096

[22] Filed: Dec. 7, 1977

Related U.S. Application Data

[63] Continuation of Ser. No. 718,092, Aug. 26, 1976, abandoned, which is a continuation of Ser. No. 615,771, Sep. 22, 1975, abandoned.

[51] Int. Cl.² .................... B01D 50/00; B60J 13/02
[52] U.S. Cl. .................... 55/385 B; 55/327; 55/331; 55/336; 55/414; 55/418; 55/502; 55/503; 55/505; 180/54 A
[58] Field of Search .................. 55/320, 327, 331, 332, 55/336, 337, 385 B, 413, 414, 418, 447–450, 463, 473, 502, 503, 505, DIG. 28; 180/54 A, 69 R, 69.01

[56] References Cited

U.S. PATENT DOCUMENTS

| 935,658 | 10/1909 | Joedicke | 55/502 |
|---|---|---|---|
| 1,111,633 | 9/1914 | Young | 55/DIG. 28 |
| 1,375,422 | 4/1921 | Sherer | 55/503 |
| 1,535,800 | 4/1925 | Anderson | 55/DIG. 28 |
| 1,828,816 | 10/1931 | Pierson | 55/DIG. 28 |
| 2,198,819 | 4/1940 | Holm | 55/337 |
| 2,269,664 | 1/1942 | Hallerberg | 55/502 |
| 3,791,112 | 2/1974 | Lidstone | 55/337 |
| 3,847,577 | 11/1974 | Hansen | 55/337 |
| 3,987,862 | 10/1976 | Lidstone | 55/450 |

*Primary Examiner*—Frank W. Lutter
*Assistant Examiner*—David L. Lacey
*Attorney, Agent, or Firm*—Merchant, Gould, Smith, Edell, Welter & Schmidt

[57] ABSTRACT

An improved air cleaner designed for insertion in the air intake conduits of over-the-road vehicles, to have the same diameter as the conduits, and to be readily replaceable as a unit. The invention particularly includes an air-permeable member which tapers, in combination with streamliners for improving the flow of air through the device.

13 Claims, 4 Drawing Figures

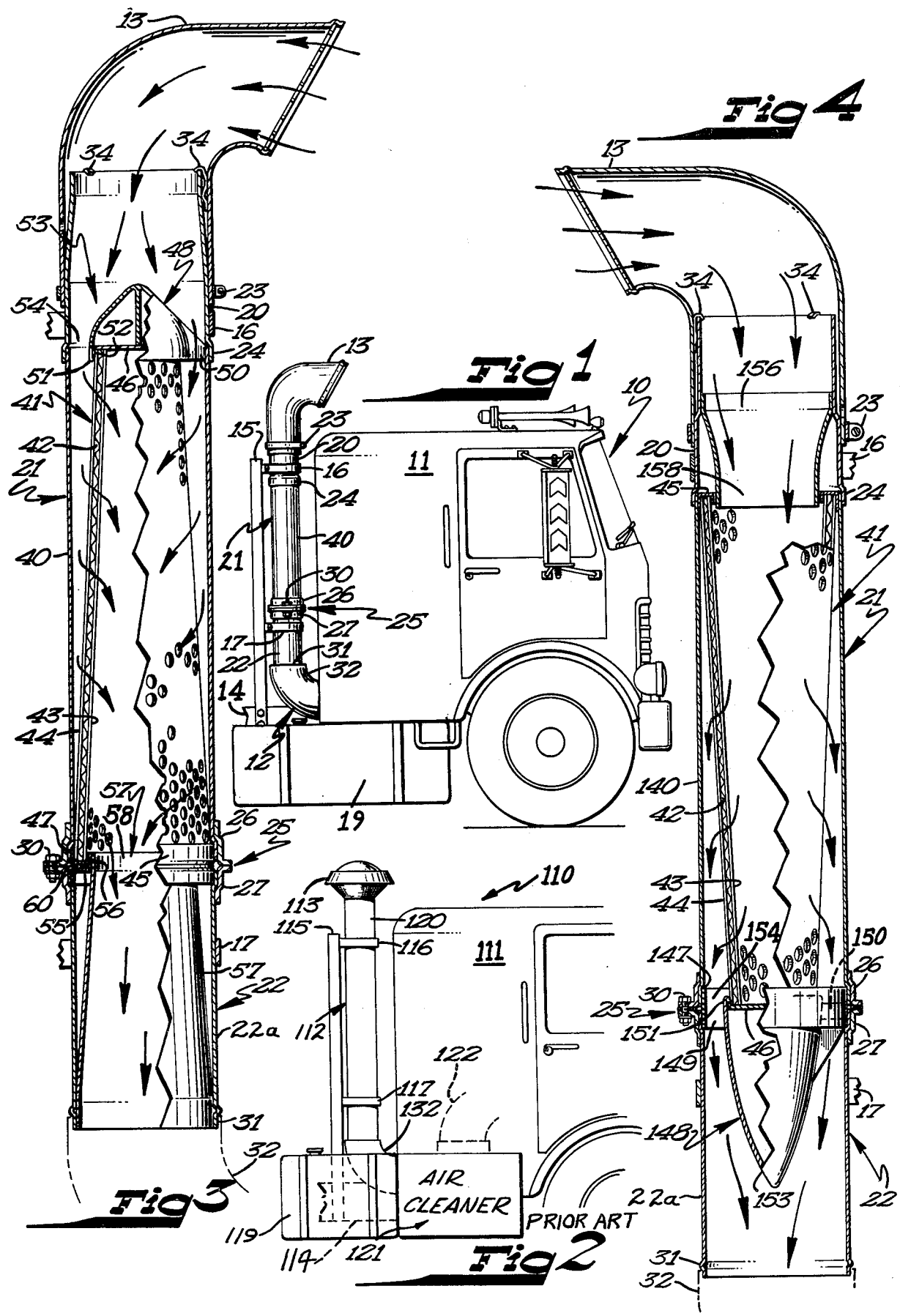

AIR CLEANER SYSTEM FOR OVER-HIGHWAY TRUCKS

This is a continuation of application Ser. No. 718,092, filed Aug. 26, 1976 and now abandoned, which is a continuation of Ser. No. 615,771, filed Sept. 22, 1975, now abandoned.

BACKGROUND OF THE INVENTION

This invention relates to the field of automotive engineering, and more particularly to the design of equipment for removing particulate matter from the air drawn into the engines of over-the-road and other vehicles.

In such vehicles, it has been customary to supply air to the engine inlet through a conduit extending rearward from the engine and then upward to an inlet fitting behind and above the cab roof. In this conduit there is connected a filter element, frequently in the form of a hollow member of pleated paper closed at one end so that the air passes through the pores of the paper and particulate matter is retained on the paper surface. Vehicle engines ingest large quantities of air, and in order to reduce the "restriction" or pressure drop in the conduit as far as possible, the latter is made of relatively large diameter. Eight inches is an exemplary diameter for such conduits.

The air cleaners used in such systems became a familiar sight to those using the highways. In diameter they were very comparable with the fuel tank of the vehicle, and for lack of other space they were frequently mounted in an area which could have been used for greater fuel capacity if the fuel tank could have been longer.

Over the years, these air cleaners have been improved by eliminating an initial centrifugal cleaner stage found unnecessary for this service, by using pleated paper cylinders with thinner walls, and by realistic redesigning to set a more appropriate service mileage aim. Each step reduced the physical dimensions of the unit, while maintaining its air flow. It appeared that the limit in improvement by refining mechanical design had been reached. Chemical treatment of the paper offered some room for improvement. One of the principal causes for breakdown of pleated paper filter elements is ingestion of water, and a new inlet fitting which extracts the water by ram action before the air reaches the paper allowed the use of a slightly smaller filter. All these arrangements were designed to be used continuously until accumulation of particulate matter increased the restriction of the filter beyond what was tolerable: the bottom of the housing was then taken off, the element removed and a new element installed.

SUMMARY OF THE INVENTION

I, for the first time, appreciated that more than two inches of diameter could be saved in these air cleaners simply by tapering the filter element and making the housing of no greater diameter than that element at its large end. This gives the same cross-sectional area of space around the filter at one end: while that area reduces to zero as the other end of the filter is approached, I realized that the volume of air flowing through that area was also decreasing, since air was continually passing through the wall of the filter. This is, of course, true whichever way the air flows through the filter. As a part of my inventive concept, I configured the components of my overall cleaner by designing its various parts to act as internal or external diffusers, reducing the restriction and hence increasing the possible flow rate. Finally, by supplying quick release couplings at its ends I produced a cleaner which is unitarily installable anywhere in the air inlet conduit, the new structure being inexpensive enough to permit it to be discarded in toto, although reuse of the outer housing with a new filter medium is also possible.

Various advantages and features of novelty which characterize the invention are pointed out with particularity in the claims annexed hereto and forming a part hereof. However for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing,

FIG. 1 is a partial side view of an over-the-road vehicle equipped with apparatus according to the invention;

FIG. 2 is a fragmentary view like FIG. 1 but showing a typical prior art arrangement;

FIG. 3 is a view in longitudinal section of a first embodiment of the invention; and FIG. 4 is a similar view of a second embodiment of the invention.

DESCRIPTION OF THE PREFERRED EMBODIMENTS

FIG. 1 shows the front portion of an over-the-road vehicle 10 incorporating the invention, having a fuel tank 19. In this vehicle, as is typical, the cab 11 is mounted over the engine, not shown, and the air inlet for the engine is supplied thereto through a conduit 12 extending rearwardly and then upwardly to terminate in an inlet fitting 13 above and behind the cab. Conduit 12 is supported from the frame 14 of the vehicle by means including a suitable vertical mounting 15 and a pair of clamps 16, 17. Conduit 12 includes an inlet tube 20, a cleaning element assembly 21, and an outlet assembly or means 22. Fitting 13 is secured to tube 20 by a clamp 23, and is shown to comprise a L-fitting arranged for direct impact at its opening by the air through which the vehicle is moving.

Assembly 21 is telescoped into tube 20 at a connection 24. Assembly 22 and assembly 21 are joined by a flange coupling 25 including a first flange 26 secured to assembly 21, a second flange 27 secured to assembly 22, and a plurality of fasteners such as bolts 30 passing through the two flanges. Assembly 22 is telescopically received in and secured to the engine air intake 32 at a connection 31. The diameters of members 20, 21 and 22 are essentially the same.

FIG. 2 is typical of prior art structure. Here, conduit 112 is shown connected to an inlet fitting 113 and supported from frame 114 of vehicle 110 by a vertical member 115 and clamps 116 and 117. Conduit 112 is integral with an inlet tube 120, and includes an air cleaner assembly 121 and an outlet tube 122. Assembly 121 is of considerably larger diameter than are members 120 and 122, and is located directly ahead of the fuel tank 119, which is accordingly limited in volume. The lower portion of assembly 121 must remain accessible for renewing of the filter element.

Reference should now be had to FIG. 3. Inlet fitting 13 is shown to be supported on inlet tube 20 by internal clips 34 as well as being clamped at 23. Assembly 21 is shown to comprise a housing 40 telescopically received in tube 20 at its upper end, and carrying flange 26 at its lower end. Contained within housing 40 is a tapered air-permeable member 41 comprising a cone of pleated paper 42 suitably supported as by inner and outer perforated members 43 and 44 an end ring 45, and an end cap 46. Members 43–46 are adhesively secured to cone 42 so as to protect and support the latter and maintain the pleat spacing to preserve the active filtering area of the element. Cap 46 closes the entire smaller end of the unit, while ring 45 closes off the ends of the pleats but leaves the center of the unit fully open.

Ring 45 is slidably received in an annular recess 47 at the bottom of housing 40. Secured to the small end of member 41 is a positioning member 48 having a plurality of radial arms 50 which engage the inner surface of housing 40. Member 48 is releasably secured to member 41 by a plurality of spring clips 51 which snap over the edge 52 of cap 46, and includes a portion which is configured to function in tube 20 as a streamliner 53, specifically a contractor or effuser, 53. Streamliner 53 in combination with tube 20 thus preserves laminar flow of the air as it passes from tube 20 through the annular space 54 between housing 40 and the small end of element 41.

Outlet assembly 22 includes an outlet tube 22a, which is shown to has flange 27 at its upper end. A ring 55 is pressed into the top of tube 22a, and includes an inner lip 56 into which is pressed the outside of a streamliner 57, specifically a diffuser, which tapers outwardly to engage tube 22a and maintain laminar flow as the channel diameter changes from the circular area 58 within member 41 to the full diameter of conduit 12. A gasket 60 fits around lip 56 to engage ring 45 of member 41 and act as a seal between member 41 and the outlet tube. It is to be noted that in this embodiment of the invention the air flow through the conical pleated paper cone 42 is from outside to inside.

A particular advantage of the structure described is the case with which member 41 may be changed when it becomes laden with particulate matter to an extent which reduces its efficiency undesirably. To make this change, clamp 16 is loosened, and clamp 17 as well if additional freedom is required. Bolts 30 are removed, and members 13, 20 and 21 are lifted as a unit and displaced sidewards, the separation occuring at gasket 60. Now if the inside of member 41 is grasped, the member may be withdrawn downwardly from housing 40, positioning member 48 being withdrawn unitarily therewith. Clips 51 may be released, member 48 removed and applied to the cap 46 of a fresh member 41, and the process reversed to restore operation of the apparatus. Gasket 60 will normally remain on ring 55, and may be replaced if this appears to be desirable.

A second embodiment of the invention is generally like that described, but differs in arranging for the air to pass through the conical pleated paper filter from the inside to the outside. Identical elements in the two figures are given the same reference numerals. As before, inlet fixture 13 is mounted on inlet tube 20 by clips 34 and clamp 23, assembly 21 is telescopically received in the inlet tube, and outlet assembly 22 is connected to assembly 21 by flange connection 25. Assembly 21 includes a housing 140, the air-permeable member 41 including pleated paper cone 42, inner and outer perforated members 43 and 44, end ring 45, and end cap 46.

A positioning member 148 forming part of the outlet assembly 22 is secured to end cap 46 by spring clips 151. It includes a portion configured to function in tube 22 as a streamliner 153, specifically a diffuser, of slightly different configuration from that of streamliner 53. Member 148 has arms 150 secured to a ring 149 which is a sliding fit into recess 147 in housing 140. Streamliner 153 maintains linear air flow from the annular space 154 surrounding the small end of member 41 to the outlet assembly 22.

Pressed into inlet tube 20 is a streamliner 156, specifically a contractor or effuser for maintaining linear flow of air from the tube 20 to the circular area 158 within ring 45.

To replace permeable member 41 when necessary is nearly as easy in the structure described as in that of FIG. 3. After the clamps are loosened, flange connection 25 is separated, this time by a distance sufficient to allow streamliner 153 to be displaced sideways with the respect to tube 22a. Then by grasping diffuser 153, the streamliner and member 41 are drawn downward out of housing 140 as a unit. Positioning member 148 may be uncliped and applied to a new permeable member, and the process reversed to complete the replacement. Note that streamliner 156 is dimensioned at its lower end to readily enter into ring 45 of member 41.

From the foregoing it will be evident that I have invented a new and improved arrangement for removing particulate matter from an air supply, which arrangement is of complex dimensions and, moreover, is particularly adapted for convenience in changing pleated paper filter cones as they become loaded.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. Air induction apparatus for the air intake of the engine of an over-the-road vehicle comprising, in combination:
   (a) an inlet fitting mounted on the vehicle and having a forwardly directed opening which allows air to flow therethrough;
   (b) and a conduit connecting said fitting to the air intake of the engine, and including in succession a readily replaceable cleaning element assembly and air outlet means;
   (c) said cleaning element assembly comprising an outer housing of uniform diameter, a hollow, conical, air-permeable member within said housing having a first end engaging the inner surface of said housing and a second end spaced inwardly from said housing, positioning means centering said second end of said member in one end of said housing and providing free annular access with the outer surface of said member, filter means positioned and arranged with respect to said member for filtering air passing therethrough, and further means sealing said first end of said member in the other end of said housing while providing free circular access with the inside surface of said member;

(d) and said outlet means defining a passageway having an inlet and an outlet and increasing in cross-sectional area from its inlet to its outlet, to receive clean air discharged from said member and conduct it to said air intake.

2. The structure of claim 1 in which the oulet means comprises a streamliner.

3. The structure of claim 2 in which said conical element is positioned in said housing with its smaller end toward said inlet fitting, so that air from said fitting flows through said member from outside to inside.

4. The structure of claim 3 in which said positioning means includes a streamliner directing flow of air from said inlet fitting to the annular access area, and said further means includes an input connection to the streamliner of said outlet means.

5. The structure of claim 3 in which the inside diameter of the streamliner of said outlet means varies.

6. The structure of claim 5 in which the outside diameter of the streamliner of said positioning means varies.

7. The structure of claim 2 in which said conical member is positioned in said housing with its large end toward said inlet fitting, so that air from said fitting flows through said member from inside to outside.

8. The structure of claim 7 in which the positioning means for said conical member includes a connection to the streamliner of said outlet means, and said further means includes a streamliner having an inlet and an outlet and directing flow of air from said inlet tube to the circular access area.

9. The structure of claim 8 in which the outside diameter of the streamliner of said outlet means varies.

10. The structure of claim 8 in which the inside diameter of the streamliner in said further means varies.

11. The structure of claim 1 further comprising releasable means for maintaining said inlet fitting and the components of said conduit in axial apposition.

12. Air induction apparatus for the air intake of the engine of an over-the-road vehicle comprising, in combination:
(a) an inlet fitting mounted on the vehicle and having a forwardly directed opening which allows air to flow therethrough;
(b) and a conduit connecting said fitting to the air intake of the engine, and including in succession a readily replaceable cleaning element assembly and air outlet means;
(c) said cleaning element assembly comprising an outer housing of uniform diameter, a hollow, conical, air-permeable member within said housing having a first end engaging the inner surface of said housing and a second end spaced inwardly from said housing, positioning means centering said second end of said member in the end of said housing nearest said inlet fitting and providing free annular access with the outer surface of said member, filter means positioned and arranged with respect to said member for filtering air passing therethrough, and further means sealing said first end of said member in the other end of said housing while providing free circular access from the inside surface of said member to said outlet means;
(d) and said outlet means comprising a streamliner having an inlet and an outlet and increasing in cross-sectional area from inlet to outlet and means positioning said streamliner to receive at its smaller end clean air discharged from said member, and to conduct said air to said engine intake.

13. Air induction apparatus for the air intake of the engine of an over-the-road vehicle comprising, in combination:
(a) an inlet fitting mounted on the vehicle and having a forwardly directed opening which allows air to flow therethrough;
(b) and a conduit connecting said fitting to the air intake of the engine, and including in succession a readily replaceable cleaning element assembly and air outlet means;
(c) said cleaning element assembly comprising an outer housing uniform diameter, a hollow, conical air-permeable member within said housing having a first end engaging the inner surface of said housing and a second end spaced inwardly from said housing, positioning means centering said second end of said member in the end of said housing nearest said outlet means and providing free annular access with the outer surface of said member, filter means positioned and arranged with respect to said member for filtering air passing therethrough, and further means sealing said first end of said member in the other end of said housing while providing free circular access to the inside surface of said member from said inlet fitting;
(d) and said outlet means comprising an outlet tube containing a streamliner and means positioning said streamliner in said outlet tube to define therewith a passageway having an inlet and an outlet and increasing in cross-sectional area from said inlet to said outlet, and the passageway located to receive at its inlet end clean air discharged from said member, and to conduct said air to said engine intake.

* * * * *

UNITED STATES PATENT AND TRADEMARK OFFICE
CERTIFICATE OF CORRECTION

PATENT NO. : 4,157,902

DATED : June 12, 1979

INVENTOR(S) : Joseph C. Tokar

It is certified that error appears in the above–identified patent and that said Letters Patent are hereby corrected as shown below:

Column 3, line 24, "effuser, 53." should be changed to --effuser.--.

Column 3, line 42, change "case" to --ease--.

Column 4, line 20, change "diffuser" to --streamliner--.

Signed and Sealed this

Twenty-third Day of October 1979

[SEAL]

Attest:

RUTH C. MASON
Attesting Officer

LUTRELLE F. PARKER
Acting Commissioner of Patents and Trademarks